Nov. 20, 1945. J. J. SEAVER 2,389,166
FLUE INSERT FOR REGENERATIVE FURNACES AND THE LIKE
Filed Jan. 20, 1942
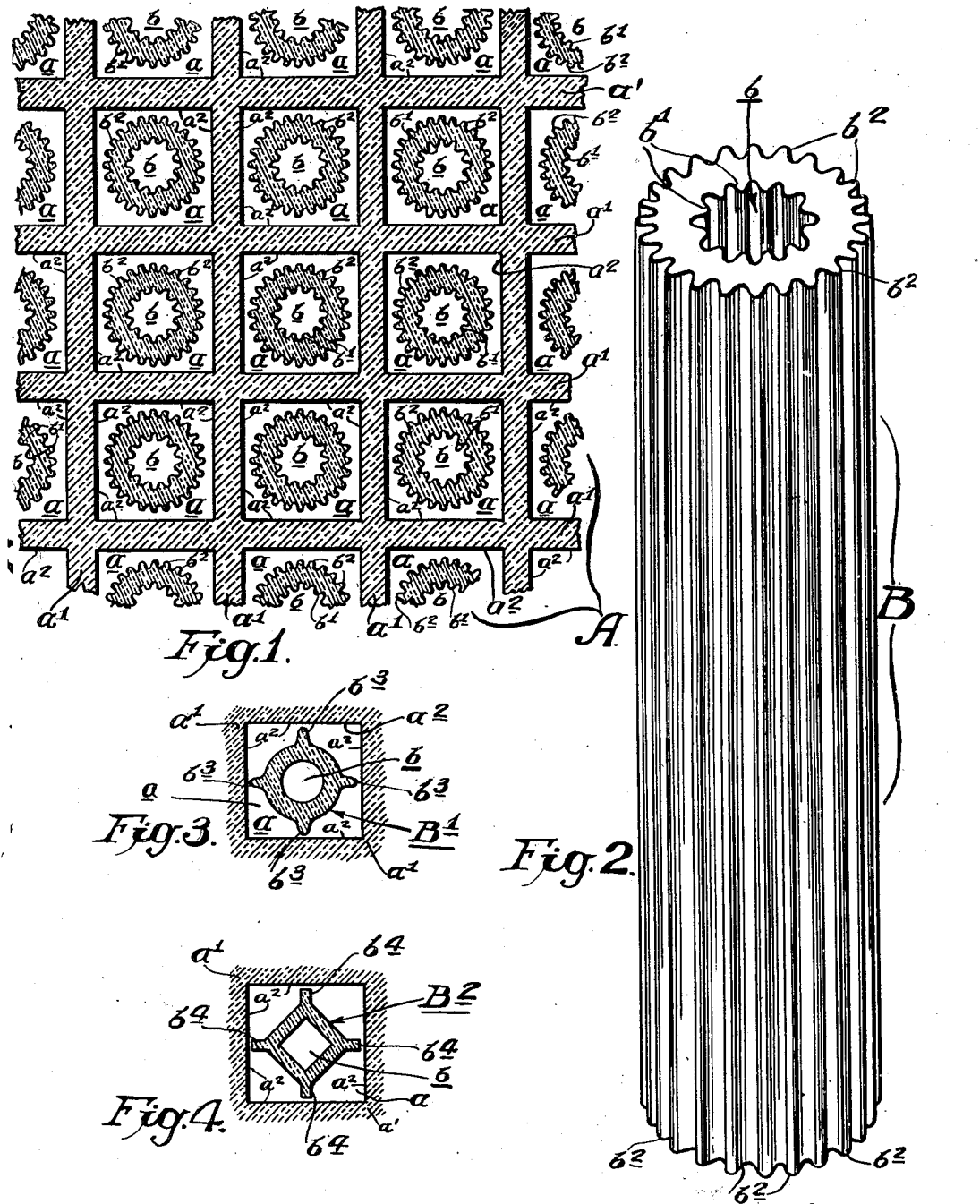
Inventor:—
Jay J. Seaver
by his Attorneys
Howson & Howson Patented Nov. 20, 1945

2,389,166

UNITED STATES PATENT OFFICE 2,389,166

FLUE INSERT FOR REGENERATIVE FURNACES AND THE LIKE

Jay J. Seaver, Evanston, Ill.

Application January 20, 1942, Serial No. 427,504

4 Claims. (Cl. 263—51)

This invention relates to regenerative furnaces, stoves and the like embodying a multiplicity of parallel flues, formed of or lined with fire brick or like material having high heat-absorbing qualities, through which hot combustion gases pass to heat the inner surfaces of the flues, and wherein air of relatively lower temperature is subsequently passed through the flues to extract the absorbed heat from the flue surfaces for use in places remote to the flues, in well-known manner for well-known purposes.

Usually the parallel flues are arranged vertically in a checker-board, honeycomb, or other interfitting or adjacently-abutting arrangement, in cross-sectional plan, and the individual flue channels are of round or multi-sided cross-sectional area.

The efficiency of the cross-sectional shape of the flues depends upon the number of square feet of heat-transferring surface per cubic foot capacity of the flue.

Prior to the present invention, attempts have been made to increase the area of the walls of the flue per foot of the flue's length, by forming the interior walls with various irregular deviations from purely circular or flat surfaces. While this system effected an increase in the area of the interior surface of the flue, it involved difficulties and unwarranted expense, as compared to the value of the results obtained, in coring the irregular shapes in the brick of which the flues were constructed, and was only applicable to new work, not existent flues.

Attempts have been made to overcome the difficulties above noted, by placing balls or other small mobile shapes of fire brick in the flues, new or old, to absorb heat from the gases and transfer the heat to the air subsequently passed through the flues. These, while serving the purpose to some extent, were objectionable from other angles in that they tended to restrict the flow, as to volume, and increased the velocity to an excessive point where the absorbing material did not have sufficient time to extract the maximum amount of heat from the gases or to transfer the maximum amount of heat to the air subsequently passed through the flues.

The object of the present invention is to provide a specific form of heat-absorbing and transferring insert for the flues, whereby the flow per unit of time, the absorption per unit of time, and the transfer per unit of time will be brought into substantial balance to obtain the greatest degree of efficiency per unit of fuel consumed.

Referring to the drawing:

Fig. 1 is a cross-sectional plan view of a portion of a checker-board flue arrangement in an apparatus of the kind noted above;

Fig. 2 is a perspective view of one of the inserts made according to the present invention; and Figs. 3 and 4 are cross-sections of modified forms of insert.

As shown in Fig. 1, a flue structure of the checkerboard type is illustrated at A, as comprising a plurality of flue channels $a$, $a$, of substantially square cross-sectional area, separated and formed by perpendicularly-intersecting walls $a^1$, $a^1$.

Centrally located in each or any desired number of the flue channels $a$, $a$ are coaxially-aligned tubular inserts B, one of which, in the preferred form of the invention, is shown in Fig. 2.

The tubular inserts B are of any desired length convenient for molding, handling, and assembling, in new or in existing flues.

Preferably, the tubular inserts are of circular form with the interior and/or exterior surfaces thereof longitudinally ribbed, fluted or corrugated, as indicated at $b^1$ and $b^2$, respectively, in Figs. 1 and 2; or with the interior surface of the axial bore or core opening $b$ in plain circular form, as indicated in Fig. 3, with a plain circular or a full ribbed, corrugated, or fluted exterior surface; or with spaced longitudinal ribs $b^3$ formed on the exterior thereof, as indicated on the insert $B^1$ of Fig. 3, the outer edge of said ribs being arranged to engage the interior faces $a^2$, $a^2$ of the flue channels $a$, if desired.

If desired, the tubular insert may be of any other suitable cross-sectional form, such as square, as indicated at $B^2$ in Fig. 4. Obviously other geometric shapes may be provided without departing from the spirit of the invention.

If desired, the square-shaped insert $B^2$ may be provided with diagonally-extending longitudinal ribs $b^4$, as shown in Fig. 4.

In flues having no inserts and wherein the flat faces $a^2$ are depended upon solely to absorb and transfer heat, there are certain heat losses resulting from the central or axial part of the flow of hot gases through a flue channel $a$ never making contact with the walls of the flue. According to the present invention, the tubular insert corrects this condition without interfering with the normal flow and without excessively increasing the velocity, by reason of the flow being divided so that the immediately axial portion of the flow must engage the fluted interior walls $b^1$ of the core openings $b$, $b$ of the axially-aligned inserts B, B, while the outer portions of the flow are caused to engage the fluted exterior surfaces $b^2$ of the aligned surfaces and the adjacent flue surfaces $a^2$, thereby eliminating dead spots in the flow and extracting or absorbing the maximum amount of heat from the flow of hot gases as they pass through the flues at a velocity sufficiently low to enable the flue walls and inserts to extract substantially all the heat from the gases in their travel from one end to the opposite end of each flue.

The reverse is true when the source of heat is interrupted and relatively low temperature air is subsequently passed, usually in a reverse direction to that of the hot gases, through the flues, i. e. the maximum amount of heat is extracted from the walls and inserts and transferred thereby into the flow of air, no dead spots being present in the center of the flow as in cases where no inserts are present.

I claim:

1. A circumferentially and longitudinally continuous tubular flue insert, said insert being open at each of its opposite ends and installed in a vertical flue coaxially therewith and with the exterior surface of said insert spaced inwardly from the internal surface of said flue to afford selective passage of high or low temperature gaseous fluids axially through the open center of the insert and longitudinally about the exterior of said insert in contact with the internal and external surfaces of the insert and the interior surface of said flue for the purpose described.

2. A circumferentially and longitudinally continuous tubular flue insert having longitudinal ribs on its exterior surface, said insert being open at each of its opposite ends and installed in a vertical flue coaxially therewith and with the exterior surface of said insert spaced inwardly from the internal surface of said flue to afford selective passage of high or low temperature gaseous fluids axially through the open center of the insert and longitudinally about the exterior of said insert in contact with the internal and external surfaces of the insert and the interior surface of said flue for the purpose described.

3. A circumferentially and longitudinally continuous tubular flue insert having longitudinal ribs on its interior surface, said insert being open at each of its opposite ends and installed in a vertical flue coaxially therewith and with the exterior surface of said insert spaced inwardly from the internal surface of said flue to afford selective passage of high or low temperature gaseous fluids axially through the open center of the insert and longitudinally about the exterior of said insert in contact with the internal and external surfaces of the insert and the interior surface of said flue for the purpose described.

4. A circumferentially and longitudinally continuous tubular flue insert having longitudinal ribs on each of its interior and exterior surfaces respectively, said insert being open at each of its opposite ends and installed in a vertical flue coaxially therewith and with the exterior surface of said insert spaced inwardly from the internal surface of said flue to afford selective passage of high or low temperature gaseous fluids axially through the open center of the insert and longitudinally about the exterior of said insert in contact with the internal and external surfaces of the insert and the interior surface of said flue for the purpose described.

JAY J. SEAVER.